United States Patent
Ptasinski et al.

(10) Patent No.: US 7,197,548 B1
(45) Date of Patent: Mar. 27, 2007

(54) METHOD AND APPARATUS FOR VERIFYING CONNECTIVITY AMONG NODES IN A COMMUNICATIONS NETWORK

(75) Inventors: Henry Ptasinski, Mountain View, CA (US); Tracy Mallory, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 660 days.

(21) Appl. No.: 09/619,553

(22) Filed: Jul. 19, 2000

Related U.S. Application Data

(60) Provisional application No. 60/144,789, filed on Jul. 20, 1999.

(51) Int. Cl.
*G06F 11/00* (2006.01)
*G06F 15/173* (2006.01)
*G06F 15/16* (2006.01)

(52) U.S. Cl. .................. 709/223; 709/224; 709/227; 370/248; 370/254

(58) Field of Classification Search ........ 709/201–206, 709/220–225, 226, 227, 238; 370/254, 256, 370/248
See application file for complete search history.

(56) References Cited

U.S. PATENT DOCUMENTS

| | | | |
|---|---|---|---|
| 4,991,204 A | 2/1991 | Yamamoto et al. | 379/221 |
| 5,812,779 A | 9/1998 | Ciscon et al. | 395/200 |
| 5,870,562 A | 2/1999 | Butman et al. | 395/200.68 |
| 6,269,079 B1 * | 7/2001 | Marin et al. | 370/230 |
| 6,360,260 B1 * | 3/2002 | Compliment et al. | 709/224 |
| 6,411,997 B1 * | 6/2002 | Dawes et al. | 709/224 |

OTHER PUBLICATIONS

Bernd Kampmann et al., "APPN Architecture and Product Implementation Tutorial," *APPN Tutorial*, May 1, 1991, pp. 43-71, Chapter 4, IBM Red Book. (XP-002113526).

Radia Perlman, "Interconnection: Bridges and Routers," pp. 195-197, Addison-Wesley, Jan. 1, 1992. (XP-002161778).

* cited by examiner

*Primary Examiner*—Bunjob Jaroenchonwanit
*Assistant Examiner*—Ramsey Refai

(57) ABSTRACT

For each node, elapsed periodic time intervals are provided and counted since the transmission of a link integrity indication frame, a frame which can be received by all other nodes on the network and which contains a source identifier. Frames are received from a sending node and a node state status and a current received frame source address are maintained during each periodic time interval. Upon expiration of the periodic time interval, if the node state status is not indicative of network traffic and a count of the elapsed periodic time intervals since transmission of a link integrity indication frame is greater than a predefined count limit, a link integrity indication frame is transmitted.

44 Claims, 7 Drawing Sheets

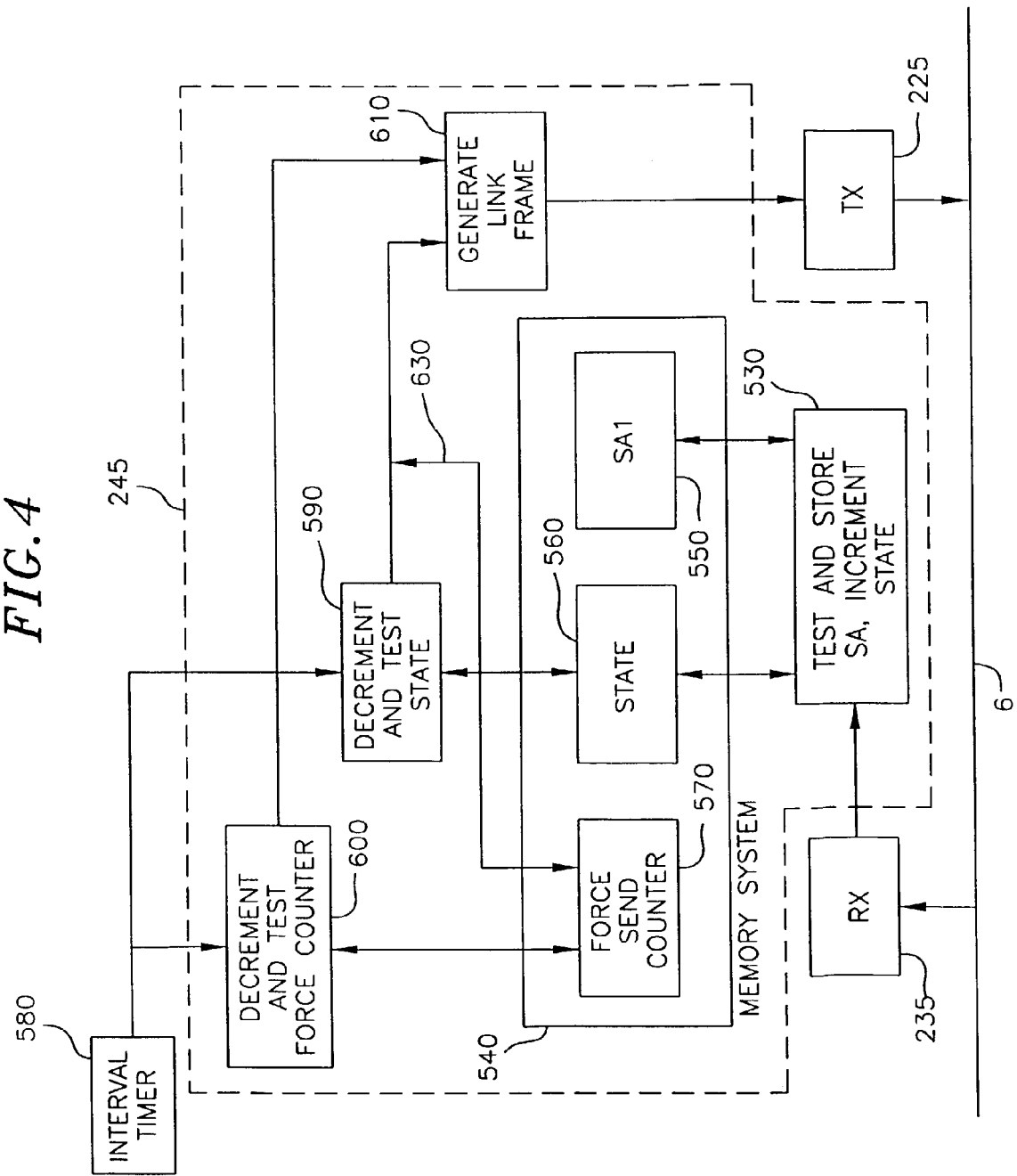

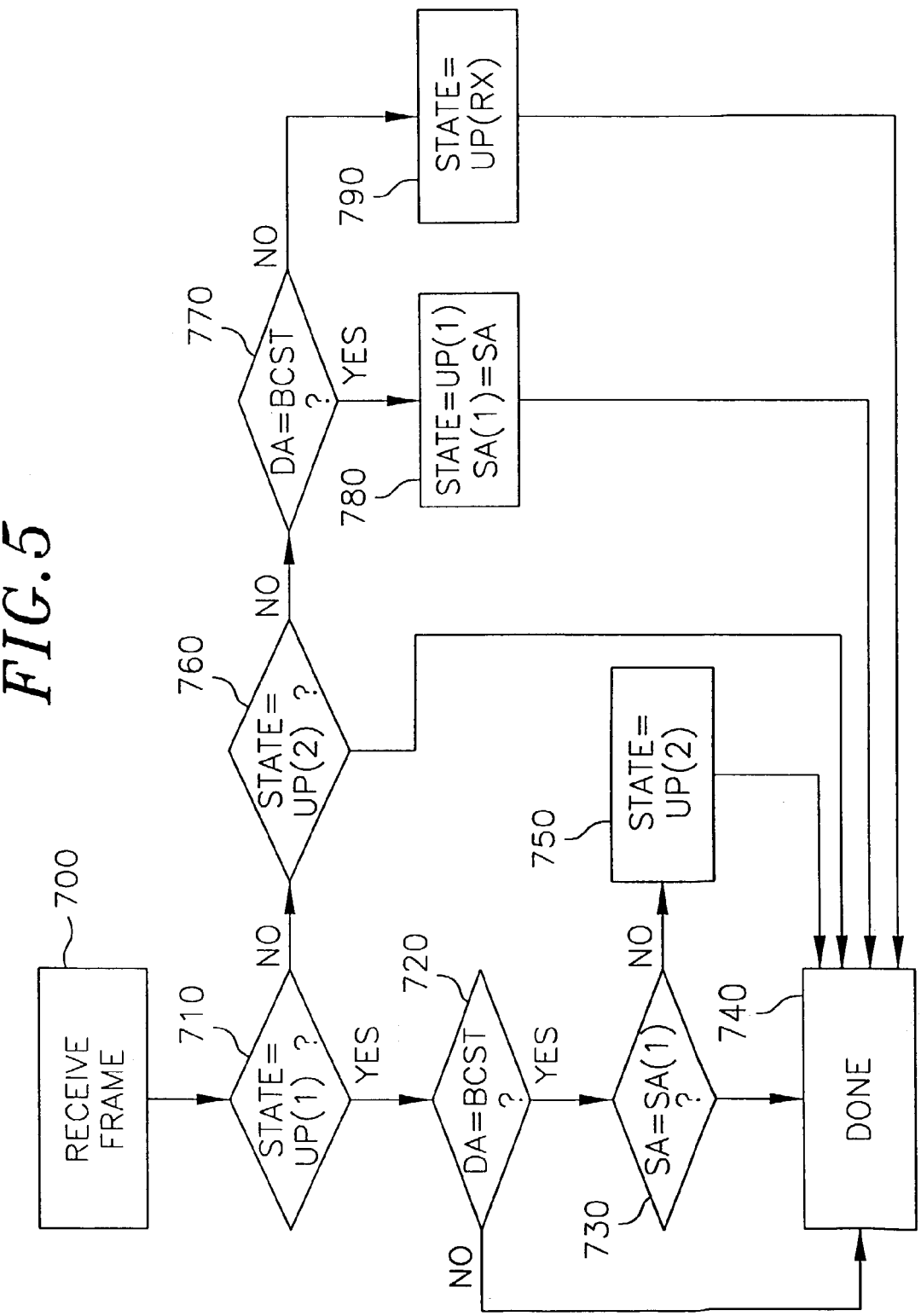

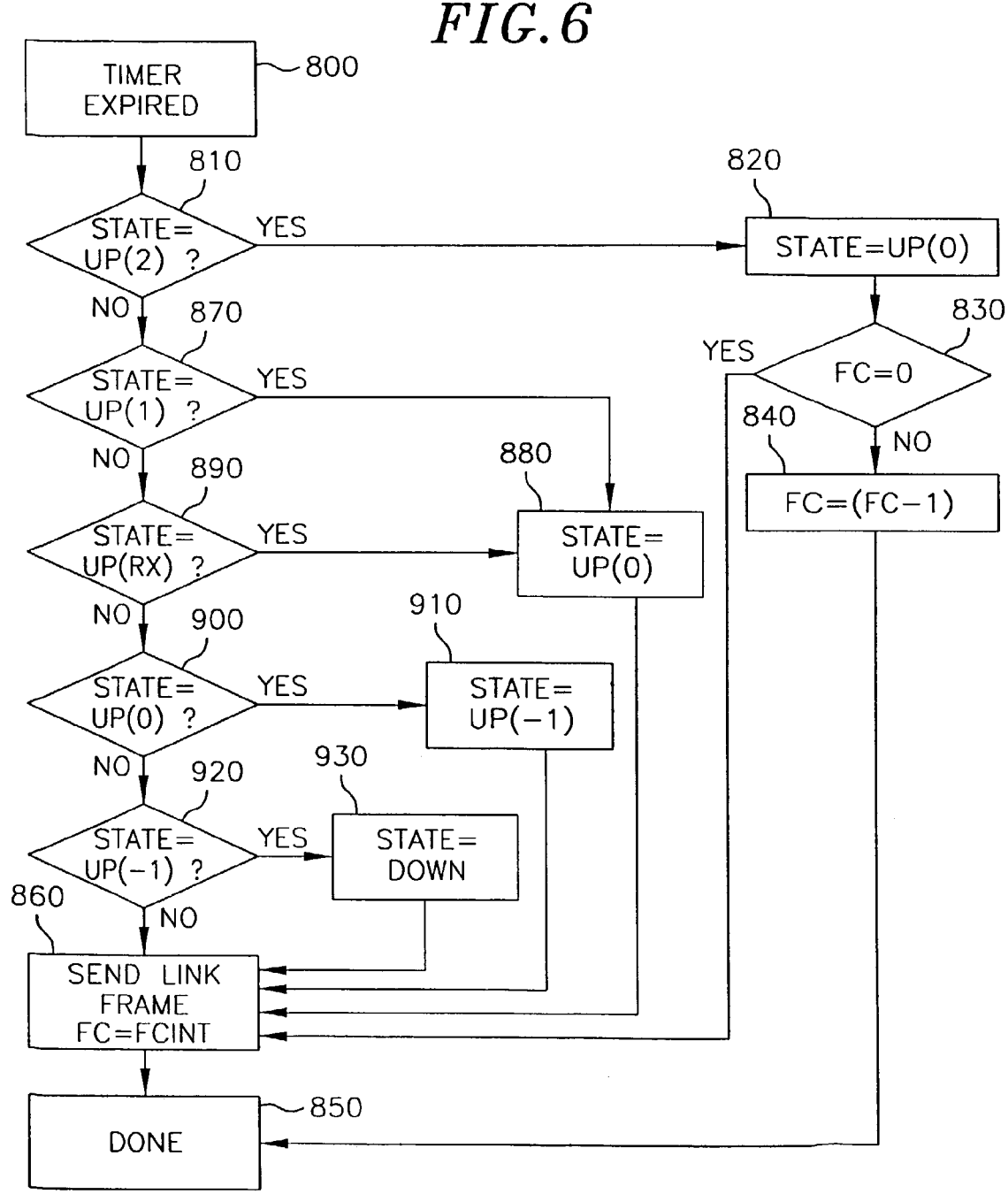

METHOD AND APPARATUS FOR VERIFYING CONNECTIVITY AMONG NODES IN A COMMUNICATIONS NETWORK

CROSS-REFERENCE TO RELATED APPLICATIONS

This application claims the benefit of the filing date of U.S. Provisional Application No. 60/144,789, filed Jul. 20, 1999.

BACKGROUND OF THE INVENTION

The present invention relates generally to data networks, and more particularly to a method of verifying connectivity between nodes in a communications network.

A communications network is a group of nodes interconnected by a transmission medium. The term "node" relates to any device that shares frames of data with other nodes in the network. Devices that may make up a node are computers, printers, scanners, etc. A node may also be a telephone, a television, a set-top box for televisions, a camera or other electronic sensing or communication device. Any device that can send and/or receive frames of data with other devices via a communication medium may be a node for purposes of the present invention.

The transmission medium that links each node in a network is equally one of a diverse family of media. Common media used include unshielded twisted pair (e.g. phone wire, CAT-5 cabling), power lines, optical fiber, coaxial cable and wireless transmission media. The operations that each individual node performs in order to access data from, and transmit data to, the rest of the network may be logically broken down into seven layers according to the ISO Open Systems Interconnection (OSI) seven-layer network model, which is also referred to as the "network stack,". The seven layers, from the bottom to the top are: 1) the PHYSICAL layer, 2) the DATA LINK layer, 3) the NETWORK layer, 4) the TRANSPORT layer, 5) the SESSION layer, 6) the PRESENTATION layer, and 7) the APPLICATION layer. FIG. 1 illustrates the ISO seven-layer reference model.

The PHYSICAL layer, or physical link layer, is concerned with transmission of unstructured bit stream traffic over physical media, and relates to the mechanical, electrical, functional, and procedural characteristics to access and receive data from the physical medium. The DATA layer, sometimes referred to as the data link layer, provides for the reliable transfer of information across the physical link. It is concerned with sending frames, or blocks of data, with the necessary synchronization, error control, and flow control. The NETWORK layer separates the uppermost layers from the transmission and switching technologies used to connect nodes. It relates to establishing, maintaining, or terminating connection between nodes.

The TRANSPORT layer relates to reliability and transparency in data transfers between nodes, and provides end-to-end error recovery and flow control. The SESSION layer provides control to communications between applications, and establishes, manages, and terminates connections between cooperating applications. The PRESENTATION layer provides independence to the application processes from differences in data syntax or protocols. Finally, the highest layer, the APPLICATION layer, provides access to the OSI environment for users. Much more has been written about the benefits and distributed functionality of such an arrangement of layers and need not be recounted here.

In frame-based networks, there are two fundamental models or topologies: 1) broadcast/multipoint networks, where all nodes are physically attached to the same network medium, and use a single, shared channel and frames transmitted on the network are visible to all nodes; and 2) point-to-point networks, where pairs of nodes are connected to each other with communication channels which are not connected to any other nodes on the network. Frames transmitted on one channel are not visible to nodes on other channels unless the frames are retransmitted onto the other channels by a node that is connected to multiple channels. Each channel may use a separate segment of the network medium, or multiple channels may share a single segment using e.g., Frequency Division Multiplexing or Time Division Multiplexing techniques. One common example of such a point-to-point network topology is that used for IEEE 10BaseT 802.3 networks, with network nodes connected via point-to-point Category 5 unshielded twisted pair cable, using multi-port devices called hubs to retransmit frames received from one network segment to all other segments.

Each node in either type of network has within it a device that permits the node to send and receive data frames in the form of electrical, electromagnetic, or optical signals. The device is conventionally a semiconductor device implementing the PHYSICAL layer of the network connectivity, and the medium access control (MAC) portion of the DATA layer of network connectivity. For effective interconnectivity, it is important to periodically check to make sure the communication channels, or media, between nodes are functional. When all or part of the media is not functional, data may be lost and the network is rendered useless.

Methods of verifying connectivity of communication channels between nodes in a multi-node network exist. In point-to-point networks, such as those promulgated by IEEE 802.3, SMDS, and HDSL standards, the verification methods operate on the individual point-to-point communication channels between two nodes only. They do not provide verification for connectivity between multiple nodes. They are also not adaptable to broadcast networks.

Connectivity verification methods for broadcast methods exist as well. These methods operate at the highest layer of the network stack, the APPLICATION layer. They are designed to test and monitor overall network operation, thereby consuming large amounts of bandwidth of the shared medium. They are also not designed to identify problems at the lower network layers, such as connectivity problems at the PHYSICAL layer, separately and independently from problems at the higher layers, such as problems with the TRANSPORT layer at a node.

Verification methods at the APPLICATION layer suffer from even further shortfalls. To implement them, the network must have at least one high-level system containing a complex software application with connectivity verification capability. This software application also requires that other nodes contain some sort of embedded software, at a minimum to communicate with the software application to confirm connectivity results. Further, by placing verification functionality at the APPLICATION layer, the verification information is required to go from the APPLICATION layer at one node to the NETWORK layer at each of the other nodes, and then back again in order to complete the verification process. This requires that all of the layers through which the verification information passes must operate properly, or the verification will fail.

Therefore, a method and system are needed for verifying connectivity between nodes in both broadcast and point-to-point networks and that operate at lower levels of the network stack, while minimizing verification traffic on communication channel, and while operating separately and independently of higher-layer hardware and software in each node. The present invention provides such a method and system.

SUMMARY OF THE INVENTION

In accordance with the present invention, a method and apparatus for verifying connectivity between network nodes in a communications network is provided. For each node periodic time intervals are provided. Elapsed periodic time intervals are counted since transmission of a link integrity indication frame, the link integrity indication frame being a frame which, when transmitted by a network node, can be received by all other nodes on the communications network and which contains a source identifier, such as a source address, that uniquely identifies a transmitting node. Frames are received from a sending node and a node state status and a current received frame source address are maintained during each periodic time interval. Upon the expiration of a predetermined elapsed time interval the node state status and a count of the elapsed periodic time intervals since transmission of a link integrity indication frame are determined. A link integrity indication frame is transmitted based upon determining the count of predetermined elapsed time intervals as being greater than a predefined count limit and the node state status as not being indicative of network traffic. A counter is incremented every time a periodic time interval elapses and the network node has not sent a link integrity indication frame during the elapsed time interval. The counter is reset whenever the network node transmits a link integrity indication frame. A node initial state status is established upon receipt of a frame from another node on the network. Upon receiving a subsequent frame within the predetermined elapsed time interval, the maintained current received frame source address is compared with a subsequent frame source address. If the comparing indicates a same source address, the node state status remains unchanged. If the comparing indicates a different source address, the node state status changes to being indicative of network traffic and transmitting a link integrity indication frame is suppressed.

BRIEF DESCRIPTION OF THE DRAWINGS

FIG. 4 is a simplified block diagram of a more detailed embodiment of the present invention.

FIG. 5 is a flow diagram depicting the operation of a receive aspect of the present invention.

FIG. 6 is a flow diagram depicting the operation of a timeout aspect of the present invention.

DETAILED DESCRIPTION

Figure 1:
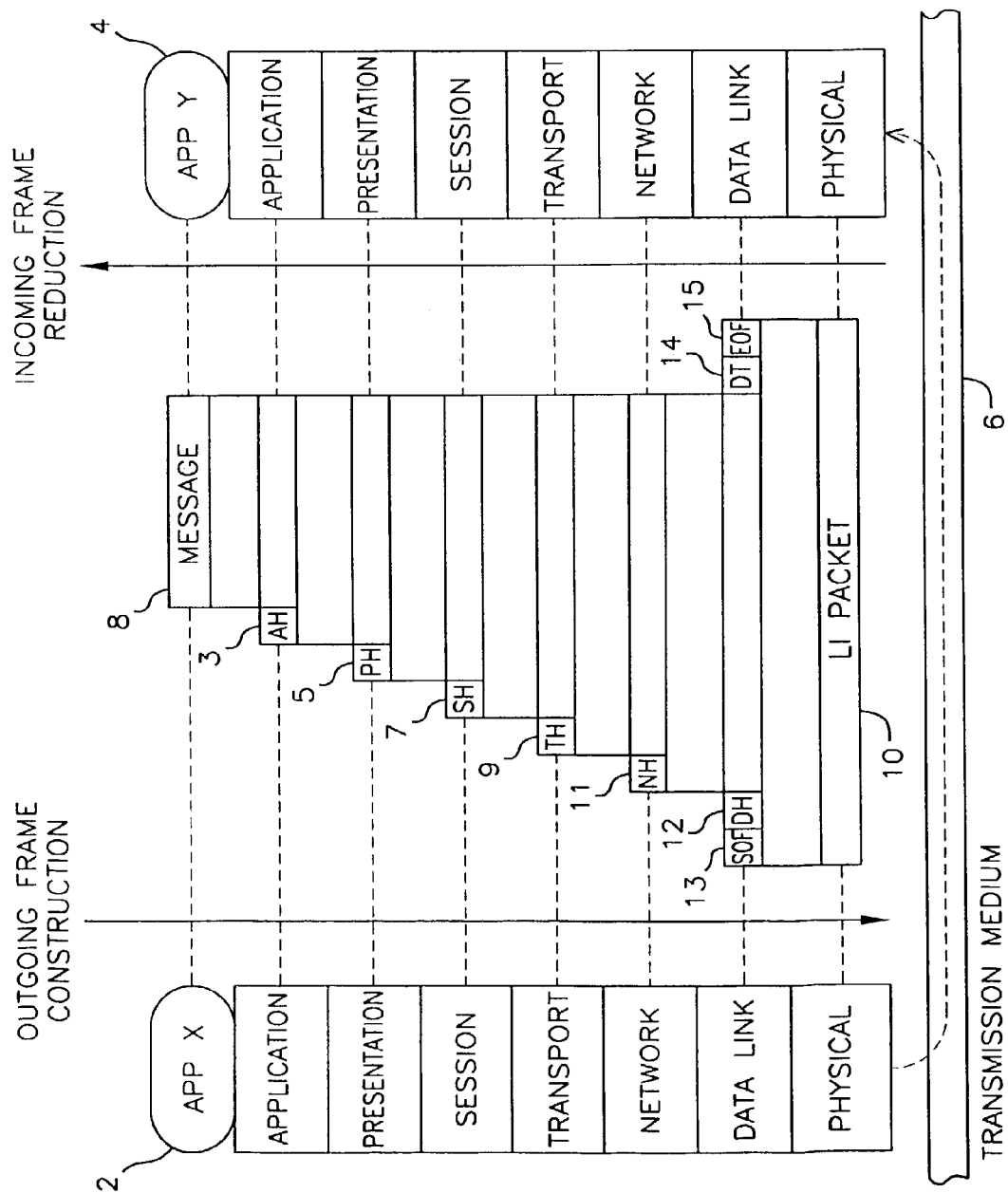
FIG. 1 is a seven-layer network stack model, according to the ISO seven-layer network standard, as used in accordance with the present invention.

Returning to FIG. 1, there is shown a basic network illustrating a network communication protocol between first node 2 that runs an application ("APP X") and another node 4 that runs the same or different application ("APP Y"). Nodes 2 and 4 communicate message 8 via transmission medium 6. In the example shown in FIG. 1, when node 2 has message 8 to send to node 4, it transfers the message down through its network stack on the left, from layer to layer. Application header (AH) 3 is appended to message 8 in the APPLICATION layer, to identify the application being executed by node 2. Original message 8, plus the application header AH, is passed to the PRESENTATION layer, where it is again appended with a presentation layer header (PH) 5. Such process continues, accordingly adding session header (SH) 7, transport header (TH) 9 and network header (NH) 11 down to the DATA layer, where the message and appended headers are encapsulated with data layer header (DH) 12 and start of frame (SOF) indicator 13. The DATA layer also may add data trailer (DT) 14 and end of frame (EOF) indicator 15. Data layer header 12 may include a source address (SA) to identify node 2 sending the message, and may also include a destination address (DA) to identify the intended recipient or group of recipients.

The message with appended headers, trailers and indicators is then passed to the PHYSICAL layer where it is passed on to network transmission medium 6. When received by node 4, the reverse process occurs in the network stack of node 4. At each layer, the header and/or trailer information is stripped off as message 8 ascends the network stack.

The details of the network stack in FIG. 1 are provided for reference only, and the present invention is not limited to functioning with network stack implementations that exactly match FIG. 1.

The present invention may be implemented at the lower levels of the network stack shown in FIG. 1, and preferably at the DATA layer. A link integrity (LI) frame 10 sent from a node represents message 8 at the DATA layer stage, and includes at least a DATA layer header. The source address (SA) is set to the sending node's network address, and the destination address, if any, is set to the network's broadcast address, or any other well-known multicast address that all nodes within a network receive, when the network is a broadcast/multipoint network. The LI Frame 10 may or may not be a complete DATA layer frame, and may or may not contain a data payload, such as message 8 with appended headers from the higher-level layers, for example. The LI frame 10 criteria may be satisfied by any data frame having at least the DATA layer header and source address, and which will be received by all nodes on the network. The LI frame 10 may also contain a destination address, as discussed above. Therefore, any frame that is sent from one node and destined for all other interconnected nodes in the network, including normal transmission frames, may fulfill the requirements for the automatic suppression feature, described below, of the present invention, and minimizes overhead needed to verify link connectivity.

Figure 2:
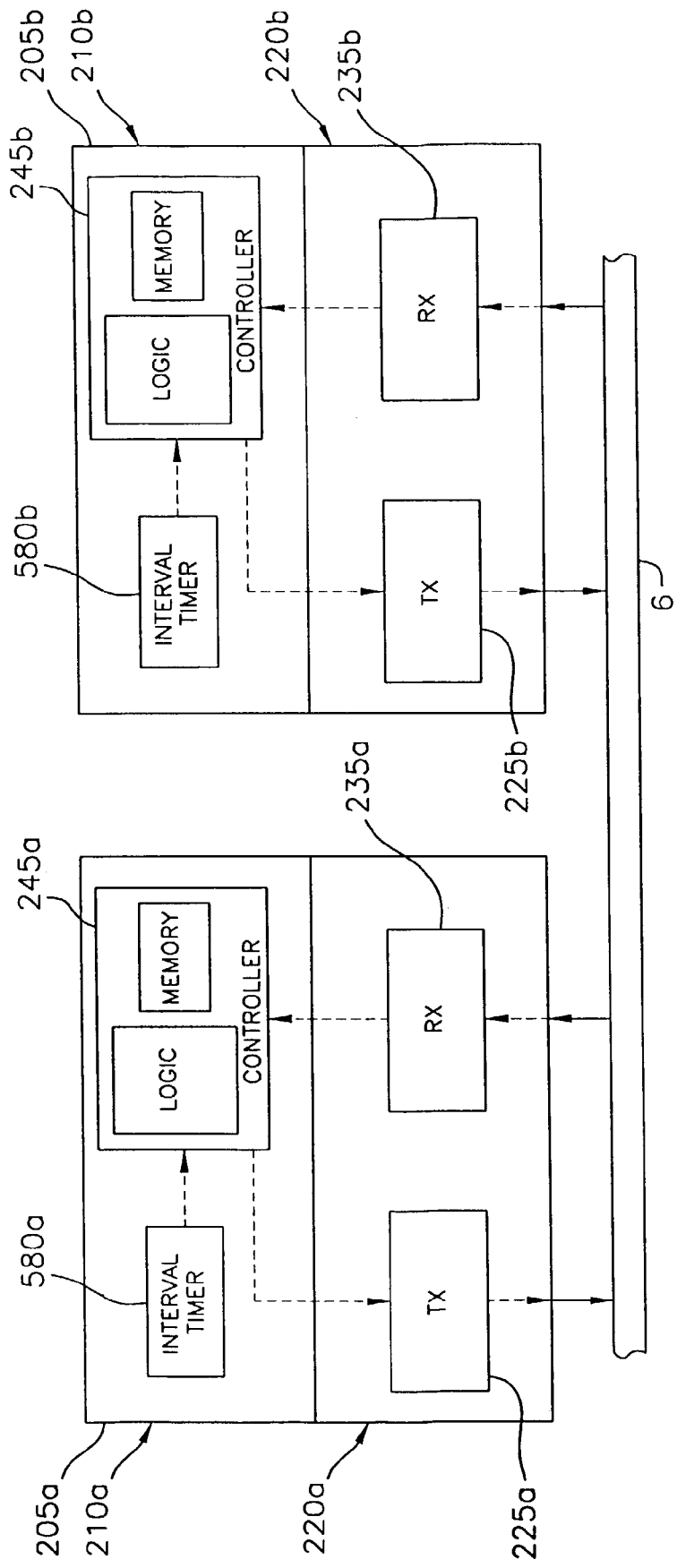
FIG. 2 shows a simplified block diagram of an embodiment of the present invention.

Referring now to FIG. 2, the lower two layers are shown in greater detail. It should be understood that these layers are typically implemented as a combination of logic and memory storage that is configured to carry out the task of the layer. The logic can be in the form of hardware, software, firmware, or a combination of those. Each layer may also be implemented using programmable gate array (PGA) technology, such as system programmable gate arrays (SPGA) and field programmable gate arrays (FPGA). Also, each layer, or a combination of the layers, may be implemented as an integrated circuit or software program. Therefore, it should be apparent to those skilled in the art, that there are many ways in which to implement the inventions described herein.

FIG. 2 shows DATA layers 210a, 210b and PHYSICAL layers 220a, 220b for a representative pair of nodes 205a, 205b according to the invention. Each node has within it semiconductor device(s) that implement the PHYSICAL layer as well as the medium access control (MAC) portion of the DATA layer, such as that implemented by the Broadcom Corporation Model BCM 4210 Controller. As discussed above, the PHYSICAL layer is concerned with transmission and reception of bit stream traffic to and from the transmission medium. Transmitters 225a, 225b and receivers 235a, 235b form a transmission medium interface, and may be implemented as a single device or separate devices. In DATA layers 210a, 210b, in addition to the components needed to implement the normal DATA layer functions, interval timers 580a, 580b continually keep a predetermined interval, at the expiration of which controllers 245a, 245b will command transmitters 225a, 225b. The controllers each include logic circuitry and memory system circuitry. The memory system circuitry includes control circuitry and storage. The logic circuitry verifies connectivity between interconnected nodes based upon information obtained from storage and controls the transmission, including possibly suppressing the transmission, of LI frames 10. Receivers 235a, 235b receive frames, including LI frames 10, from other nodes in the network, and pass them to the data layer.

Figure 3A:
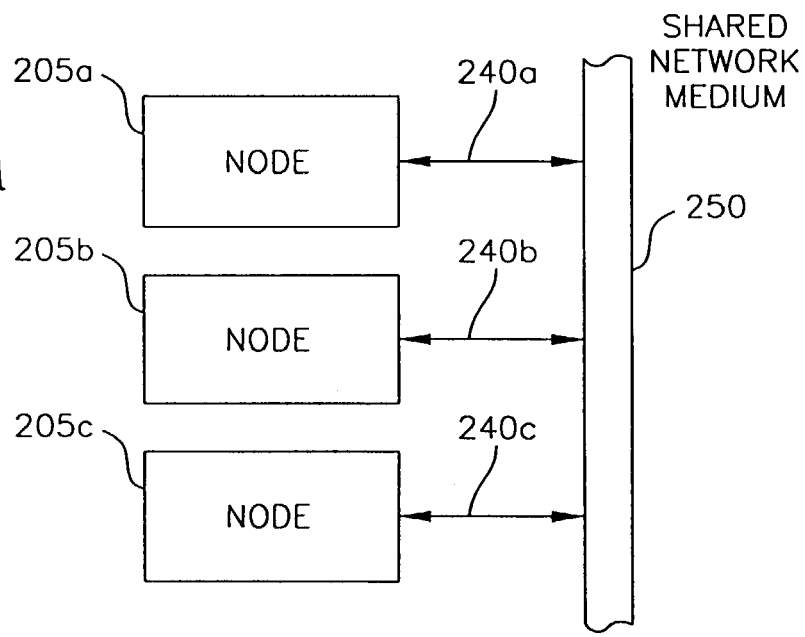
FIG. 3A is a simplified block diagram of a broadcast/multipoint network for use with the present invention.
Figure 3B:
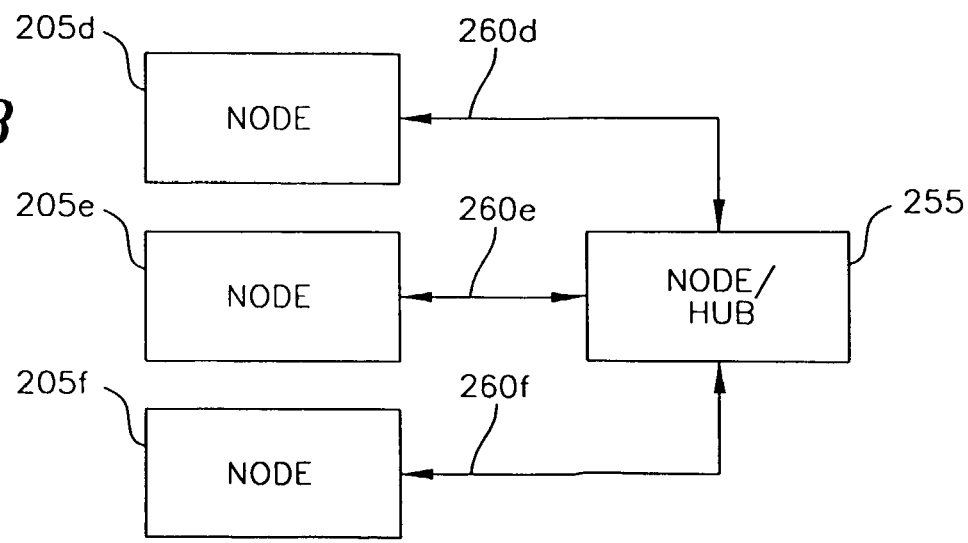
FIG. 3B is a simplified block diagram of a point-to-point network for use with the present invention.

FIGS. 3A and 3B show a broadcast/multipoint network and a point-to-point network, respectively, for use with the present invention. In FIG. 3A, representative nodes 205a, 205b, 205c are communicatively coupled with a common transmission medium 250 through individual segments 240a, 240b, 240c respectively. Thus, a message containing a broadcast destination address sent from one node is sent to all other nodes coupled with transmission medium 250. In FIG. 3B, nodes 205d, 205e, 205f are communicatively coupled to each other by individual segments 260d, 260e, 260f respectively of transmission media and hub 255. Messages sent from one node to another node on one segment are not visible to nodes on other segments unless they are retransmitted by a node that is connected to multiple segments, such as hub 255 in a network. Segments 240a, 240b, 240c and common transmission medium 250 may be (but are not restricted to) a phone line, a power line, a wireless medium, coaxial cable, or a fiber optic medium. Reference to FIGS. 3A and 3B should be made with respect to the description of the embodiments of the invention as set forth below.

An embodiment of the present invention will now be described in general terms, each node independently implementing the system, flow processes and state machines depicted in more detail and described below with reference to FIGS. 4, 5, 6 and 7.

There is no requirement for a global network controller. Each node begins in the DOWN state. When the node is in the DOWN state, the link is referred to as being "down". When the node is in any of the UP states, the link is referred to as being "up". Each node has an interval timer that runs independently of the interval timers on other nodes and independently of any received frames. At the expiration of an interval, in addition to state transitions, the node resets the interval timer to measure the next interval i.e., the node continuously measures intervals independently of any other node activity. The interval used is nominally the same on all nodes, but a high degree of accuracy between the timers on different nodes is not required. Each node has a counter that represents the number of elapsed intervals since the last time it sent an LI frame 10 (conversely, the counter can be implemented to represent the number of intervals left until it must send an LI frame 10). This counter is incremented every time the interval timer expires and the node does not send an LI frame 10. This counter is reset whenever the node transmits an LI frame 10. When a node receives any frame sent from another node in the network, either due to expiration of an interval of the other node's independent interval timer or due to higher layers sending other network traffic, the node decides that there is connectivity with the network. If the received frame does not satisfy the link integrity frame criteria as described above, the node moves to the UP(RX) state. The receiving station at this point also knows that the sending node is present and active on the network, and records the source address in a table of all active nodes on the network. If the frame received satisfies the LI frame 10 criteria as described above (DATA layer header, source address, and visible by all nodes on the network), the node moves to the UP(1) state and the SA received is stored as a first source address received in the current interval (SA1). If the node receives another frame meeting the LI criteria within a predetermined number of intervals (typically but not necessarily one interval), the SA is compared to SA1. If it is the same, the node remains in the UP(1) state. If it is different, indicating the LI frame 10 was sent from a different node that sent the previously received LI frame 10, the node moves to an UP(2). If the node receives frames which do not meet the LI criteria, the node remains in the current (UP(1) or UP(RX)) state. The receiving node also records the source address in the table of all active nodes on the network. When a node's interval timer expires, it updates the count of elapsed intervals since the last time it sent an LI frame 10. If the node is in the UP(2) state, it transitions to the UP(0) state and conditionally sends an LI frame 10 using the following logic: if the force send counter is less than a set limit ("force send limit"), the node does not send an LI frame 10 and the force send counter is incremented; if the number of elapsed intervals is equal to or greater than the force send limit, the node sends an LI frame 10 and the force send counter is reset. The force send limit is generally large relative to the interval size. For example, the interval may be one second and the force send limit may be one minute. A different force send limit can be used on each node in the network to prevent any synchronization effects, and the force send limit may be fixed for a given node or it may be reset to a (possibly random value) within some range each time the node is forced to send when transitioning out of the UP(2) state. By the mechanism of conditionally entering the UP(2) state and conditionally sending frames when exiting the UP(2) state, LI traffic that is redundant (i.e. does not convey any additional information about the state of the network than has already been conveyed by other recently sent or received frames) is suppressed. This automatic suppression of excess traffic lowers the bandwidth required to verify connectivity. In cases where there is sufficient additional network traffic, the additional network bandwidth required to verify connectivity is nearly zero. By use of the force send counter and force send limit, every node on the network will occasionally send an LI frame 10, even if the additional traffic on the network would normally suppress sending of LI frames 10. This mechanism allows all nodes on the network to compile a list of addresses of all other nodes present and active on the network. If the node is in any state other than UP(2) when it's interval timer expires, it sends an LI frame 10, resets the force send counter, and transitions to the next lower state. For every subsequent interval where the node does not receive any frame from the network, the node transmits an LI frame 10 and moves down one more state. In the example, the node would move from the UP(1) or UP(RX) state to the UP(0) state. In the next interval, it would move from the UP(0) state to the UP(–1) state. The UP(–1) state adds immunity to occasional frame losses, and also compensates for differences in the lengths of the intervals measured by each node. Any number of UP(–N) states may be added in a given implementation before the DOWN state is realized. The negative number corresponds to a fixed number of intervals desired before a node should declare a problem with connectivity. Adding additional UP(–N) states provides greater immunity against transient frame losses. In the general case, if the node is in state UP(–N) when its interval timer expires, the node would transition to the UP(–(N+1)) state, if one exists, otherwise it would transition to the DOWN state. In the above description, one more expired interval of sending an LI frame 10 and not receiving an LI frame 10 from the network moves the node back to the DOWN state. Having reached this state from an UP state, the node will declare a problem with connectivity on the network. Whenever the node transitions into or out of the DOWN state, notification of a change in the link status is provided to other modules of the node that have an interest in the link state. Examples are a user-visible indicator of the link state, which presents some indication that the link is either up or DOWN, or higher-layers of the network stack, which may react to changes in the link state by enabling or inhibiting frames from being sent to the network interface, or re-routing frames to or from other network interfaces.

Referring now to FIGS. 4, 5, 6 and 7, the operation of the present invention is described in more detail. Referring first to FIG. 4, the basic processing of the state machine has two components: a receive aspect and a transmit aspect. At the receive side a frame comes in to receiver (RX) 235 from medium 6. Receiver 235 has both the MAC and PHY layer processing elements and does all the demodulation and framing of the received frame. The received frame gets sent to controller 245 of the link integrity portion of the system formed by controller 245 and interval timer 580. The frame may also go to other portions of the system (not shown) because it may be a valid data frame, which is another feature of the system, that is, link integrity frames are only needed when there is not sufficient other traffic, thereby providing reduced overhead. Test and Store SA, Increment State logic 530 takes the frame after receive processing undertaken by receiver 235. Logic section 530 checks the source of the frame, manages the state of the link integrity state machine, possibly recording the source of the frame if it meets the criteria of being a broadcast frame, completing the initial portion of the receive side processing.

Two components of shared memory system 540 are managed by the receive side, namely source address register (SA1) 550 for recording an address and link state register 560, both under control of logic section 530. Shared memory system 540 includes appropriate control and storage circuitry. The small amount of state memory of link state register 560 is provided to indicate the state that the link integrity state machine is in, the memory being adequate to identify a limited number of states labeled by a number, e.g., the "DOWN" state being labeled "0", the "UP(–1)" state being labeled by a "1", the "UP(0)" being labeled "2", etc. When states are incremented/decremented, moving through the state machine is accomplished by adding or subtracting from link state register 560. There is also located in shared memory system 540 force send counter memory sub-system 570 which is part of the transmit path logic of the link integrity mechanism.

Free running interval timer 580, running at typically 1 second intervals or whatever the overall network system would like to use, generates a signal representing that "a time window has expired". The signal is provided to logic components: decrement and test state logic 590 and decrement and test force counter logic 600. Every time interval timer 580 indicates expiration, the state will be shifted toward the DOWN state following the state machine transitions in FIG. 7. Therefore, depending on what the current state is, there may be a movement to a new state, every interval following some transition path in the state machine. Decrement and test state logic 590 also tests the state and depending on what the state is when the interval timer expires and what state is being transitioned to, there may or may not be a sending of a link integrity frame, thereby providing a suppression mechanism. For example, if the state is UP(2) when the interval timer expires, the state transitions to the UP(0) state, with the link integrity frame being suppressed because since the starting point was the UP(2) state, the node knows that there is enough other traffic on the network and it therefore does not need to add the overhead of the link integrity frame, thereby suppressing its transmission. Decrement and test state logic 590 also sends initialization signal 630 to re-initialize force send counter memory system 570 to the larger period being looked at, so that the force send is only utilized on such larger period, provided that a link integrity frame has not been sent because of the link integrity state machine. If a link integrity frame is being sent regularly and suppression is not happening, the force send mechanism, in effect, does not get used.

Interval timer 580 also affects Decrement and Test Force Counter logic 600 which manages the force sending portion of the link integrity mechanism. Whenever interval timer 580 expires, Decrement and Test Force Counter logic 600 decrements force send counter memory 570 and whenever Force Send Counter memory 570 indicates 0, if a link integrity frame based upon the decrement test of the state, then a link integrity frame will be sent by Generate Link Frame logic 610. Therefore, on some larger period than that of the interval timer period, a link integrity frame will be sent regardless of the network state. Such is basically an announcement from the node that it is on the network so that other nodes can discover it easily without any polling required or any active function on the other nodes to request information.

Therefore, as a result of the decrement and test logic processing Generate Link Frame logic 610 assembles the link integrity frame, putting on a broadcast destination address (DA), filling in the sending nodes source address (SA), filling in higher layer headers and, optionally as desired, information as to properties of the sending node, e.g., this is the chip being used, this is the driver version being used, etc. The generated link integrity frame gets sent to transmitter (TX) 225 which provides MAC timing, locates a time slot on medium 6, performs appropriate system modulation and transits the frame onto the medium, e.g., a home network twisted pair wire such as that utilized by the BCM 4210 Controller in accordance with the Home Phoneline Networking Alliance (HPNA) protocol. It should be noted that in the receive and transmit processing, standard MAC/PHY framing, modulation, etc. is used on the link integrity framing without have a special signal. The link integrity frame is treated like a regular data frame, allowing whatever desired information to be included therewithin. The preferred embodiment of the present invention can be accomplished by an implementation of basic logic circuits in hardware testing and memory management well known to those skilled in the art and is not described further herein.

Referring to FIG. 5 in conjunction with FIG. 4, a flow diagram is provided to depict the operation of Test and Store SA, Increment State logic 530. At stage 700 a frame is received. The state of node is then tested to determine the state that the node is currently in. A determination as to whether the node is in state UP(1) is determined at stage 710. If "Yes", a second test is made at stage 720 as to whether the destination address (DA) is a broadcast address (BCST). If it is not broadcast, the processing is "Done" as indicated at stage 740. If it is broadcast, a third test is then undertaken at stage 730, to determine if the received source address (SA) is equal to any stored source address (SA1). If these three tests are passed, no additional work is done with regard to link integrity processing involving the received frame (stage 740) and the state of the node remains at state UP(1). If at stage 730, SA is not equal to SA1, indicating that are two other nodes on the network (and suppression mode can be entered), transition is made to state UP(2) at stage 750, whereby when the interval timer expires it is evident that there are two nodes already on the network and a link integrity frame does not have to be sent. If at stage 710 the state is not UP(1) a test is made as to whether the state is UP(2) at stage 760, i.e., already in the suppression mode. If the state is in the suppression mode, the state remains the same and further processing is Done as indicated by stage 740. If the state at stage 760 is not UP(2), the frame then provides some new information about the network. At stage 770, a determination is made as to whether the destination address is broadcast (DA=BCST). If the destination address is broadcast, the state is transitioned to UP(1) and the address is stored in SA1 memory 550 at stage 780. If the received frame is not broadcast, then there is an indication that another node is on the network but the address is not stored and the state is transitioned to state UP(RX) at stage 790. The state UP(RX) indicates that a frame has been received, that there are nodes on the network, but there is not enough information to start performing suppression mode, i.e., since it was not broadcast, it is uncertain as to whether other nodes have seen the received frame, such as a unicast frame only directed to the present node. Therefore if other nodes have not seen the frame they may not be getting any link information and suppression cannot be undertaken. The state processing then is also Done as indicated at stage 740.

Referring to FIG. 6 in conjunction with FIG. 4, interval timer 580 is running independently of the receive processing set forth in FIG. 5. Interval timer 580 is not synchronized to any of the traffic on the network. As such, the processes and logic components implementing the decision making set forth in FIGS. 5 and 6 can be considered to run independently of each other, only interacting through shared memory system 540. When the node's interval timer 580 expires at stage 800, a determination of the current state of the node is made. At stage 810 a determination is made as to whether the state is UP(2). If the state is UP(2), a nominal suppression of the link frame occurs at stage 820 where the state transitions to UP(0) and the force counter is checked at stage 830. If the checking of the force counter indicates that it is not at 0, force counter memory system 570 is decremented (fc=fc−1) at stage 840 and the process is Done as indicated by stage 850. If at stage 830, the force counter is determined to be 0, then such indicates that it is time for the node to send a link frame independent of the state the node is in because it hasn't announced it's presence on the network for a large interval of time. A link integrity frame is then generated by link frame generator 610 as indicated above. Also at stage 860 force counter memory system 570 gets reset (fc=fcinit) as indicated above pursuant to signal 630 as described above. Referring back to stage 810, if the state is not UP(2), the possible states are checked, and appropriate state transitions undertaken. At stage 870 a determination is made as to whether the state is UP(1). If the node is in state UP(1) it transitions to state UP(0) at stage 880 and causes a link frame to be sent at stage 860 along with initializing the force counter memory system and proceeding to Done state at stage 850. If the state is not UP(1), a determination is made as to whether the state is UP(RX) at stage 890. If it is at state UP(RX), the state transitions to state UP(0) at stage 880 and causes a link frame to be sent at stage 860 along with initializing the force counter memory system and proceeding to Done state at stage 850. If the state is not at UP(RX), a determination is made as to whether the state is UP(0) at stage 900. If it is at state UP(0), the state transitions to UP(−1) at stage 910 and causes a link frame to be sent at stage 860 along with initializing the force counter memory system and proceeding to Done state at stage 850. If the state is not at UP(0), a determination is made as to whether the state is UP(−1) at stage 920. If it is at state UP(−1), the state transition to DOWN state at stage 930 and causes a link frame to be sent at stage 860 along with initializing the force counter memory system and proceeding to Done state at stage 850. If the state is not UP(−1), a link frame is caused to be sent at stage 860 along with initializing the force counter memory system and proceeding to Done state at stage 850. It should be noted that there may be more states below state UP(−1). If the node is on a network where there is a bad frame loss rate, there may be more UP(−1), UP(−2), UP(−3), etc. states to be able to help the network user determination that the network is somewhat functional. Such additional states help slow down a determination that the network is not functional, that is, is DOWN. These negative states in essence indicate that the network was up recently and is almost ready to be declared unuseable, but the node wants to wait a little bit more before indicating that the network is not functional.

Figure 7:
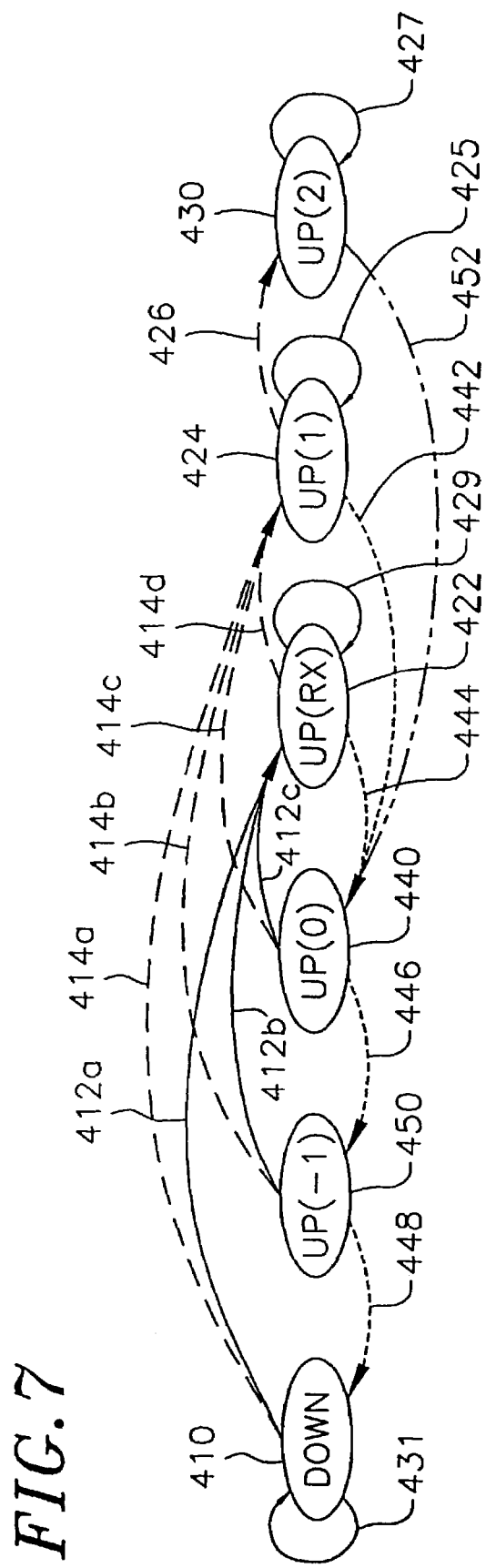
FIG. 7 depicts a state transition diagram in accordance with the embodiment of the present invention depicted by FIGS. 4, 5 and 6.

Referring to FIG. 7, there is depicted a state transition flow diagram with an accompanying flow arrow keys to further describe the implementation of the stages previously described with regard to the processes of FIGS. 5 and 6 as implemented by the system shown in FIG. 4. The flow arrows on the upper half of the diagram above the state blocks correspond to receive transitions of FIG. 5. The flow arrows on the lower half of the diagram below the state blocks correspond to the timeout transitions. Loop arrows 431, 429, 425 and 427 are also part of the receive state transitions.

Referring to DOWN state 410, UP(−1) state 450 and UP(0) state 440, all the respective transitions 412a, 412b, 412c to UP(RX) are the transitions where the node receives a generic frame that is not broadcast. These transitions follow the FIG. 5 stage path of 700 to 710 to 760 to 770 to 790 to 740. Referring to DOWN state 410, UP(−)1 state 450, UP(0) state 440 and UP(RX) state 422, all the respective receive transitions 414a, 414b, 414c and 414d to UP(1) are the transitions which follow the FIG. 5 stage path of 700 to 710 to 760 to 770 to 780 to 740. Referring to UP(1) state 424 the transition 426 to UP(2) state 430 is the receive transition which follows the path of 700 to 710 to 720 to 730 to 750 to 740. Loop 425 follows the FIG. 5 stage path of 700 to 710 to 720 to 730 to 740. Loop 427 follows the FIG. 5 stage path of 700 to 710 to 740. Loops 429, 431 both follow the FIG. 5 stage path of 710 to 720 to 740.

Referring to UP(1) state 424, UP(RX) state 422, UP(0) state 440, UP(−1) state 450 and DOWN state 410, the respective timeout transitions follow FIG. 6 stage paths. Transition 448 follows the FIG. 6 stage path of 800 to 810 to 870 to 890 to 900 to 920 to 930 to 860 to 850. Transition 446 follows the FIG. 6 stage path of 800 to 810 to 870 to 890 to 900 to 910 to 860 to 850. Transition 444 follows the FIG. 6 stage path of 800 to 810 to 870 to 890 to 880 to 860 to 850. Transition 442 follows the FIG. 6 stage path of 800 to 810 to 870 to 880 to 860 to 850. Transition 452 follows the FIG. 6 stage path of 800 to 810 to 820 to 830 and then to either 840 to 850 or 860 to 850. Those skilled in the art can appreciate that there may be other variations and modifications of the embodiments described hereinabove. For example, well-known multicast destination addressing can be used instead of the broadcast addressing. All nodes could also look at the wire promiscuously when implementing the link integrity processing (i.e., before any destination address filtering is done). Various parts of the implementation can then be simplified, such as never needing to check the destination address, and deleting the UP(RX) state. Further, source identifiers that uniquely identify a transmitting node, other than a source address can be used. For example, source identifiers could be system serial numbers, host names, or any other manually or automatically assigned unique node identifiers.

What is claimed is:

1. In a communications network, a method of verifying connectivity between a first node and one or more network nodes, comprising:
   providing indications of elapsed periodic time intervals at the first node,
   transmitting a first link integrity indication frame to the one or more network nodes, the first link integrity indication frame including a source identifier that uniquely identifies the first node;
   counting elapsed periodic time interval indications subsequent to the transmitting of the first link integrity indication frame to produce a count for the first node;
   receiving frames from the one or more network nodes and maintaining, during each periodic time interval, a node state status and a current received frame source identifier;
   determining the node state status upon the expiration of a predetermined elapsed time based on the count for the first node;
   transmitting a second link integrity indication frame based upon determining the node state status as being indicative of not having received frames from a plurality of the network nodes during the predetermined elapsed time; and
   resetting the count for the first node as a result of transmitting the second link integrity indication frame.

2. The method of claim 1, wherein the source identifier is a source address and the current received frame source identifier is a current received frame source address.

3. The method of claim 2, wherein counting the elapsed periodic time intervals includes:
   incrementing a counter every time an indication of a periodic time interval elapsing occurs and the first node has not sent the second link integrity indication frame during the elapsed periodic time interval, and
   resetting the counter whenever the first node transmits the second link integrity indication frame.

4. The method of claim 2, wherein maintaining a node state status includes:
   establishing a node initial state status upon receipt of a frame from the one or more network nodes;
   upon receiving a subsequent frame within the predetermined elapsed time, comparing the current received frame source address with a subsequent frame source address, and
   if the comparing indicates a same source address, the node state status remains unchanged, and
   if the comparing indicates a different source address, the node state status changes to being indicative of having received frames from a plurality of the network nodes during the predetermined elapsed time and transmitting the second link integrity indication frame is suppressed.

5. The method of claim 2, wherein determining the node state status as being indicative of not having received frames from a plurality of the network nodes during the predetermined elapsed time includes providing a logic state machine having a plurality of states including a down state indicative of a non-functional network link and a plurality of up states indicative of functional network links, the states being transitional therebetween based upon predetermined network node status, expiration of periodic timing intervals and receipt of frames by the first node.

6. The method of claim 2, wherein maintaining a current received frame source address includes recording the current received frame source address in a memory table.

7. The method of claim 2, wherein the first node is a node on a broadcast network.

8. The method of claim 2, wherein the first node is a node on a point-to-point network.

9. The method of claim 2, wherein the communication network is a multi-layer protocol communication network.

10. The method of claim 9, wherein transmitting the first and second link integrity indication frames is accomplished using a data link layer of the multi-layer protocol communication network.

11. The method of claim 2, wherein the first node and the one or more network nodes whose connectivity is being verified are connected using a transmission medium selected from a telephone wire, a shielded twisted pair, an unshielded twisted pair, a cable, a power line, an optical fiber, and a wireless medium.

12. In a communications network, a link integrity apparatus for verifying connectivity between a first node and one or more network nodes communicating over a transmission medium, comprising:
   a periodic time interval generator, which is adapted to provide indications of elapsed periodic time intervals;
   a counter system for counting elapsed periodic time interval indications subsequent to transmission of a first link integrity indication frame to produce a count for the first node, wherein the first link integrity indication frame is provided, by the first node, to the one or more network nodes, the first link integrity indication frame including a source identifier that uniquely identifies the first node;
   a receiver coupled to the transmission medium for receiving frames from the one or more network nodes;
   a storage system for maintaining, during each periodic time interval, a node state status and a current received frame source identifier;
   logic circuitry coupled to the counter system, the storage system and the receiver, the logic circuitry determining the node state status upon the expiration of a predetermined elapsed time based on the count for the first node; and a transmitter coupled to the logic circuitry and the transmission medium for transmitting the second link integrity indication frame over the transmission medium based upon determining, using the logic circuitry, the node state status as being indicative of not having received frames from a plurality of the network nodes during the predetermined elapsed time;

wherein, transmitting the second link integrity indication frame resets the count for the first node.

13. The link integrity apparatus of claim 12, wherein the source identifier is a source address and the current received frame source identifier is a current received frame source address.

14. The link integrity apparatus of claim 13, wherein the count for the first node is incremented by the logic circuitry every time an indication of elapsed periodic time interval occurs and the first node has not sent the second link integrity indication frame during the elapsed periodic time interval, and the count is reset whenever the first node transmits the second link integrity indication frame.

15. The link integrity apparatus of claim 13, wherein the logic circuitry maintains node state status by:
  establishing a node initial state status upon receipt of a frame from the one or more network nodes;
  upon receiving a subsequent frame within the predetermined elapsed time, comparing the current received frame source address with a subsequent frame source address, and
  if the comparing indicates a same source address, the node state status remains unchanged, and
  if the comparing indicates a different source address, the node state status changes to being indicative of having received frames from a plurality of the network nodes during the predetermined elapsed time interval and transmitting the second link integrity indication frame is suppressed.

16. The link integrity apparatus of claim 13, wherein the logic circuitry functions as a logic state machine having a plurality of states including a down state indicative of a non-functional network link and a plurality of up states indicative of functional network links, the states being transitional therebetween based upon a predetermined network node status, elapsed periodic time intervals and receipt of frames by the first node.

17. The link integrity apparatus of claim 13, wherein the memory storage system includes a memory table for maintaining the current received frame source address.

18. The link integrity apparatus of claim 13, wherein the first node is a node on a broadcast network.

19. The link integrity apparatus of claim 13, wherein the first node is a node on a point-to-point network.

20. The link integrity apparatus of claim 13, wherein the communication network is a multi-layer protocol communication network.

21. The link integrity apparatus of claim 20, wherein transmitting the first and second link integrity indication frames is performed at a data link layer of the multi-layer protocol communication network.

22. The link integrity apparatus of claim 13, wherein the first node and the one or more network nodes whose connectivity is being verified are connected using a transmission medium selected from a telephone wire, a shielded twisted pair, an unshielded twisted pair, a cable, a power line, an optical fiber and a wireless medium.

23. In a communications network, a method of verifying connectivity between a first node and one or more network nodes, comprising:
  providing indications of elapsed periodic time intervals;
  transmitting a first link integrity indication frame to the one or more network nodes, the first link integrity indication frame including a source identifier that uniquely identifies the first node;
  counting elapsed periodic time subsequent to the transmitting of the first link integrity indication frame to produce a count;
  receiving frames from the one or more network nodes and maintaining, during each periodic time interval, a node state status and a current received frame source identifiers identifier;
  upon the expiration of a predetermined elapsed time based on the count, determining the node state status and the count;
  transmitting the second link integrity indication frame based upon determining:
    the node state status as being indicative of not having received frames from a plurality of the network nodes during the predetermined elapsed time interval, and
    the count is greater than a predefined count limit; and
  resetting the count as a result of transmitting the second link integrity indication frame.

24. The method of claim 23, wherein the source identifier is a source address and the current received frame source identifier is a current received frame source address.

25. The method of claim 24, wherein counting the elapsed periodic time intervals includes:
  incrementing a counter every time an indication of a periodic time interval elapsing occurs and the first node has not sent the second link integrity indication frame during the elapsed periodic time interval, and
  resetting the counter whenever the first node transmits the second link integrity indication frame.

26. The method of claim 24, wherein maintaining a node state status includes:
  establishing anode initial state status upon receipt of a frame from the one or more network nodes;
  upon receiving a subsequent frame within the predetermined elapsed time, comparing the current received frame source address with a subsequent frame source address, and
  if the comparing indicates a same source address, the node state status remains unchanged, and
  if the comparing indicates a different source address, the node state status changes to being indicative of having received frames from a plurality of the network nodes during the predetermined elapsed time and transmitting the second link integrity indication frame is suppressed.

27. The method of claim 24, wherein determining the node state status as being indicative of not having received frames from a plurality of the network nodes during the predetermined elapsed time includes providing a logic state machine having a plurality of states including a down state indicative of a non-functional network link and a plurality of up states indicative of functional network links, the states being transitional therebetween based upon a predetermined network node status, the indications of the elapsed periodic time intervals and receipt of frames by the first node.

28. The method of claim 24, wherein maintaining a current received frame source address includes recording the current received frame source address in a memory table.

29. The method of claim 24, wherein the first node is a node on a broadcast network.

30. The method of claim 24, wherein the first node is a node on a point-to-point network.

31. The method of claim 24, wherein the communication network is a multi-layer protocol communication network.

32. The method of claim 31, wherein transmitting the first and second link integrity indication frames is accomplished using a data link layer of the multi-layer protocol communication network.

33. The method of claim 24, wherein the first node and the one or more network nodes whose connectivity is being verified are connected by a transmission medium selected from a telephone wire, a shielded twisted pair, an unshielded twisted pair, a cable, a power line, an optical fiber and a wireless medium.

34. In a communications network, a link integrity apparatus for verifying connectivity between a first node and one or more network nodes communicating over a transmission medium, comprising:
   a periodic time interval generator, which is adapted to provide indications of elapsed periodic time intervals;
   a counter system for counting the indication of the elapsed periodic time intervals subsequent to transmission of a first link integrity indication frame to produce a count for the first node, wherein the first link integrity indication frame is provided, by the first node, to the one or more network nodes, the first link integrity indication frame including a source identifier that uniquely identifies the first node;
   a receiver coupled to the transmission medium for receiving frames from the one or more network nodes;
   a storage system for maintaining, during each periodic time interval, a node state status and a current received frame source address;
   logic circuitry coupled to the counter system, the storage system and the receiver, wherein the logic circuitry, upon the expiration of a predetermined elapsed time based on the count, determines the node state status and the count; and
   a transmitter coupled to the logic circuitry and the transmission medium for transmitting the second link integrity indication frame over the transmission medium based upon the logic circuitry determining (i) the node state status is indicative of not having received frames from a plurality of the network nodes during the predetermined elapsed time and (ii) the count for the first node is greater than a predefined count limit, wherein transmitting the second link integrity indication frame resets the count for the first node.

35. The link integrity apparatus of claim 34, wherein the source identifier is a source address and the current received frame source identifier is a current received frame source address.

36. The link integrity apparatus of claim 35, wherein the count for the first node is incremented by the logic circuitry every time an indication of an elapsed periodic time interval occurs and the first node has not sent the second link integrity indication frame during the elapsed periodic time interval, and the count for the first node is reset whenever the first node transmits the second link integrity indication frame.

37. The link integrity apparatus of claim 35, wherein the logic circuitry maintains the node state status by:
   establishing a node initial state status upon receipt of a frame from the one or more network nodes;
   upon receiving a subsequent frame within the predetermined elapsed time interval, comparing the current received frame source address with a subsequent frame source address, and
   if the comparing indicates a same source address, the node state status remains unchanged, and
   if the comparing indicates a different source address, the node state status changes to being indicative of having received frames from a plurality of the network nodes during the predetermined elapsed time interval and transmitting the second link integrity indication frame is suppressed.

38. The link integrity apparatus of claim 35, wherein the logic circuitry functions as a logic state machine having a plurality of states including a down state indicative of a non-functional network link and a plurality of up states indicative of functional network links, the states being transitional therebetween based upon the network node status, expiration of periodic timing intervals and receipt of frames by the first node.

39. The link integrity apparatus of claim 35, wherein the memory storage system includes a memory table for maintaining the current received frame source address.

40. The link integrity apparatus of claim 35, wherein the first node is a node on a broadcast network.

41. The link integrity apparatus of claim 35, wherein the first node is a node on a point-to-point network.

42. The link integrity apparatus of claim 35, wherein the communication network is a multi-layer protocol communication network.

43. The link integrity apparatus of claim 42, wherein transmitting the first and second link integrity indication frames is performed at a data link layer of the multi-layer protocol communication network.

44. The link integrity apparatus of claim 35, wherein the first node and the one or more network nodes whose connectivity is being verified are connected by a transmission medium selected from a telephone wire, a shielded twisted pair, an unshielded twisted pair, a cable, a power line, an optical fiber and a wireless medium.

* * * * *